US008995359B2

(12) United States Patent
Dayal et al.

(10) Patent No.: US 8,995,359 B2
(45) Date of Patent: Mar. 31, 2015

(54) METHOD AND APPARATUS TO FACILITATE SUPPORT FOR MULTI-RADIO COEXISTENCE

(75) Inventors: Pranav Dayal, San Diego, CA (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 652 days.

(21) Appl. No.: 12/883,877

(22) Filed: Sep. 16, 2010

(65) Prior Publication Data

US 2011/0242969 A1 Oct. 6, 2011

Related U.S. Application Data

(60) Provisional application No. 61/320,902, filed on Apr. 5, 2010, provisional application No. 61/333,164, filed on May 10, 2010, provisional application No. 61/356,969, filed on Jun. 21, 2010, provisional application No. 61/374,155, filed on Aug. 16, 2010.

(51) Int. Cl.
*H04W 4/00* (2009.01)
*H04W 36/00* (2009.01)
*H04W 36/20* (2009.01)
*H04W 36/16* (2009.01)
*H04W 36/30* (2009.01)
(Continued)

(52) U.S. Cl.
CPC .......... *H04W 36/0055* (2013.01); *H04W 36/20* (2013.01); *H04W 36/16* (2013.01); *H04W 36/30* (2013.01); *H04W 88/06* (2013.01); *H04W 88/10* (2013.01)
USPC ............................ 370/329; 370/331; 370/334

(58) Field of Classification Search
CPC ........................................................ H04W 36/20
USPC .................................... 370/331, 332, 334
See application file for complete search history.

(56) References Cited

U.S. PATENT DOCUMENTS

2002/0196804 A1    12/2002   Ishiguro et al.
2003/0228892 A1    12/2003   Maalismaa et al.
(Continued)

FOREIGN PATENT DOCUMENTS

CN           101208886 A       6/2008
CN           101600261 A       12/2009
(Continued)

OTHER PUBLICATIONS

CMCC: "Addition of LTE UE RF requirements for coexistence with WLAN", 3GPP Draft; R4-100707, 3rd Generation Partnership Project (3GPP), Mobile Competence Centre : 650, Route Des Lucioles ; F-06921 Sophia-Antipolis Cedex ; France, vol. RAN WG4, No. San Francisco, USA; 20100222, Feb. 16, 2010, XP050426101, [retrieved on Feb. 16, 2010] the whole document.

(Continued)

*Primary Examiner* — Farah Faroul
(74) *Attorney, Agent, or Firm* — Rupit M. Patel

(57) ABSTRACT

A user equipment (UE) monitors coexistence issues of one or more associated communication resources. The UE initiates link recovery procedures (e.g., declaring a Radio Link Failure (RLF)) in response to the monitoring when a coexistence issue is detected. The UE can also access a new channel or a new Radio Access Technology (RAT) in response to initiating the link recovery. The network may have the ability to control whether the UE can initiate the link recovery.

21 Claims, 10 Drawing Sheets

(51) Int. Cl.
*H04W 88/06* (2009.01)
*H04W 88/10* (2009.01)

(56) References Cited

U.S. PATENT DOCUMENTS

| | | |
|---|---|---|
| 2004/0259589 A1 | 12/2004 | Bahl et al. |
| 2005/0239497 A1 | 10/2005 | Bahl et al. |
| 2009/0080499 A1* | 3/2009 | Yavuz et al. .................. 375/144 |
| 2009/0168906 A1* | 7/2009 | Hagerman et al. ............ 375/260 |
| 2009/0252122 A1 | 10/2009 | Leinonen et al. |
| 2009/0257353 A1 | 10/2009 | Song et al. |
| 2009/0274121 A1* | 11/2009 | Bertorelle et al. ............ 370/331 |
| 2009/0291640 A1* | 11/2009 | Bhattad et al. ............... 455/63.1 |
| 2010/0167719 A1* | 7/2010 | Sun et al. ...................... 455/423 |
| 2010/0202406 A1* | 8/2010 | Feder et al. ................... 370/331 |
| 2011/0195730 A1* | 8/2011 | Chami et al. .................. 455/501 |
| 2011/0223885 A1* | 9/2011 | Salkintzis et al. ............. 455/411 |
| 2011/0244863 A1* | 10/2011 | Matsuo et al. ................ 455/436 |
| 2011/0274012 A1* | 11/2011 | Jang et al. ..................... 370/259 |
| 2011/0281600 A1* | 11/2011 | Tanaka .......................... 455/500 |
| 2011/0310852 A1* | 12/2011 | Dimou et al. ................. 370/332 |
| 2012/0129560 A1* | 5/2012 | Lunden et al. ................ 455/512 |
| 2012/0269174 A1* | 10/2012 | Yang et al. .................... 370/332 |

FOREIGN PATENT DOCUMENTS

| | | |
|---|---|---|
| CN | 101637043 A | 1/2010 |
| JP | 2003009242 A | 1/2003 |
| JP | 2005012815 A | 1/2005 |
| JP | 2005328520 A | 11/2005 |
| JP | 2006332835 A | 12/2006 |
| KR | 20080019029 A | 2/2008 |
| WO | WO-2006128948 A1 | 12/2006 |
| WO | WO-2008113211 A1 | 9/2008 |
| WO | WO-2010027208 A2 | 3/2010 |

OTHER PUBLICATIONS

International Search Report and Written Opinion—PCT/US2011/031193—ISA/EPO—Jun. 21, 2011.

* cited by examiner

METHOD AND APPARATUS TO FACILITATE SUPPORT FOR MULTI-RADIO COEXISTENCE

CROSS-REFERENCE TO RELATED APPLICATIONS

The present application claims the benefit of U.S. Provisional Patent Application No. 61/320,902, filed Apr. 5, 2010, entitled "METHOD AND APPARATUS FOR MULTI-RADIO COEXISTENCE IN A WIRELESS SYSTEM," U.S. Provisional Patent Application No. 61/333,164, filed May 10, 2010, entitled "METHOD AND APPARATUS FOR COEXISTENCE-BASED RLF IN A WIRELESS COMMUNICATION SYSTEM," U.S. Provisional Patent Application No. 61/356,969, filed Jun. 21, 2010, entitled "METHOD AND APPARATUS TO FACILITATE SUPPORT FOR MULTI-RADIO COEXISTENCE," and U.S. Provisional Patent Application No. 61/374,155, filed Aug. 16, 2010, entitled "METHOD AND APPARATUS TO FACILITATE SUPPORT FOR MULTI-RADIO COEXISTENCE," the disclosures of which are expressly incorporated by reference herein in their entireties.

TECHNICAL FIELD

The present description is related, generally, to multi-radio techniques and, more specifically, to coexistence techniques for multi-radio devices.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple out (MIMO) system.

Some conventional advanced devices include multiple radios for transmitting/receiving using different Radio Access Technologies (RATs). Examples of RATs include, e.g., Universal Mobile Telecommunications System (UMTS), Global System for Mobile Communications (GSM), cdma2000, WiMAX, WLAN (e.g., WiFi), Bluetooth, LTE, and the like.

An example mobile device includes an LTE User Equipment (UE), such as a fourth generation (4G) mobile phone. Such 4G phone may include various radios to provide a variety of functions for the user. For purposes of this example, the 4G phone includes an LTE radio for voice and data, an IEEE 802.11 (WiFi) radio, a Global Positioning System (GPS) radio, and a Bluetooth radio, where two of the above or all four may operate simultaneously. While the different radios provide useful functionalities for the phone, their inclusion in a single device gives rise to coexistence issues. Specifically, operation of one radio may in some cases interfere with operation of another radio through radiative, conductive, resource collision, and/or other interference mechanisms. Coexistence issues include such interference.

This is especially true for the LTE uplink channel, which is adjacent to the Industrial Scientific and Medical (ISM) band and may cause interference therewith It is noted that Bluetooth and some Wireless LAN (WLAN) channels fall within the ISM band. In some instances, a Bluetooth error rate can become unacceptable when LTE is active in some channels of Band 7 or even Band 40 for some Bluetooth channel conditions. Even though there is no significant degradation to LTE, simultaneous operation with Bluetooth can result in disruption in voice services terminating in a Bluetooth headset. Such disruption may be unacceptable to the consumer. A similar issue exists when LTE transmissions interfere with GPS. Currently, there is no mechanism that can solve this issue since LTE by itself does not experience any degradation With reference specifically to LTE, it is noted that a UE communicates with an evolved NodeB (eNB; e.g., a base station for a wireless communications network) to inform the eNB of interference seen by the UE on the downlink. Furthermore, the eNB may be able to estimate interference at the UE using a downlink error rate. In some instances, the eNB and the UE can cooperate to find a solution that reduces interference at the UE, even interference due to radios within the UE itself. However, in conventional LTE, the interference estimates regarding the downlink may not be adequate to comprehensively address interference.

In one instance, an LTE uplink signal interferes with a Bluetooth signal or WLAN signal. However, such interference is not reflected in the downlink measurement reports at the eNB. As a result, unilateral action on the part of the UE (e.g., moving the uplink signal to a different channel) may be thwarted by the eNB, which is not aware of the uplink coexistence issue and seeks to undo the unilateral action. For instance, even if the UE re-establishes the connection on a different frequency channel, the network can still handover the UE back to the original frequency channel that was corrupted by the in-device interference. This is a likely scenario because the desired signal strength on the corrupted channel may sometimes be higher be reflected in the measurement reports of the new channel based on Reference Signal Received Power (RSRP) to the eNB. Hence, a ping-pong effect of being transferred back and forth between the corrupted channel and the desired channel can happen if the eNB uses RSRP reports to make handover decisions.

Other unilateral action on the part of the UE, such as simply stopping uplink communications without coordination of the eNB may cause power loop malfunctions at the eNB. Additional issues that exist in conventional LTE include a general lack of ability on the part of the UE to suggest desired configurations as an alternative to configurations that have coexistence issues. For at least these reasons, uplink coexistence issues at the UE may remain unresolved for a long time period, degrading performance and efficiency for other radios of the UE.

BRIEF SUMMARY

Embodiments of the present disclosure relate to a method for wireless communication. The method includes monitoring coexistence issues of at least one communication resource. The method also includes accessing a new channel or a new Radio Access Technology (RAT) in response to detection of a coexistence issue.

In a further aspect, a method of wireless communication includes determining whether to permit at least one associated User Equipment (UE) to change from a first communication resource to a second communication resource to mitigate a coexistence issue at the UE(s). The method also includes conveying an indication to the UE(s) of whether changing from the first communication resource to a second communication resource is permitted.

In another aspect, an apparatus is operable in a wireless communication system. The apparatus has means for monitoring coexistence issues of at least one communication resource. The apparatus also has means for accessing a new channel or a new Radio Access Technology (RAT) in response to detection of a coexistence issue.

In another aspect, an apparatus is operable in a wireless communication system. The apparatus has means for determining whether to permit at least one associated User Equipment (UE) to change from a first communication resource to a second communication resource to mitigate a coexistence issue at the UE(s). The apparatus also has means for conveying an indication to the UE(s) of whether changing from the first communication resource to a second communication resource is permitted.

In yet another aspect, a system for wireless communication includes at least one processor; and a memory coupled to the processor(s). The processor(s) is configured to monitor coexistence issues of at least one communication resource, and to access a new channel or a new Radio Access Technology (RAT) in response to detection of a coexistence issue.

In another aspect, a system of wireless communication includes at least one processor; and a memory coupled to the processor(s). The processor(s) is configured to determine whether to permit at least one associated User Equipment (UE) to change from a first communication resource to a second communication resource to mitigate a coexistence issue at the UE(s). The processor is also configured to convey an indication to the UE(s) of whether changing from the first communication resource to a second communication resource is permitted.

In still another aspect, a computer program product for wireless communications in a wireless network includes a computer-readable medium having program code recorded thereon. The program code includes program code to monitor coexistence issues of at least one communication resource. The program code also includes program code to access a new channel or a new Radio Access Technology (RAT) in response to detection of a coexistence issue.

In a further aspect, a computer program product for wireless communications in a wireless network has a computer-readable medium having program code recorded thereon. The program code includes program code to determine whether to permit at least one associated User Equipment (UE) to change from a first communication resource to a second communication resource to mitigate a coexistence issue at the UE(s). Also included is program code to convey an indication to the UE(s) of whether changing from the first communication resource to a second communication resource is permitted.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
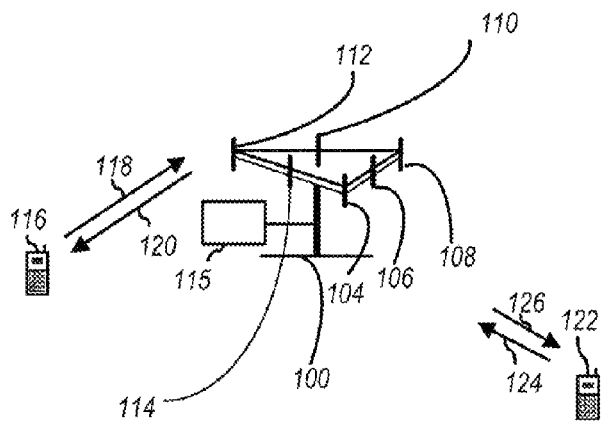
FIG. 1 illustrates a multiple access wireless communication system according to one aspect.

Various aspects of the disclosure provide techniques to mitigate coexistence issues in multi-radio devices, where significant in-device coexistence problems can exist between, e.g., the LTE and Industrial Scientific and Medical (ISM) bands (e.g., for BT/WLAN). As explained above, some coexistence issues persist because an eNB is not aware of interference on the UE side that is experienced by other radios. According to one aspect, the UE declares a Radio Link Failure (RLF) and autonomously accesses a new channel or Radio Access Technology (RAT) if there is a coexistence issue on the present channel. The UE can declare a RLF in some examples for the following reasons: 1) UE reception is affected by interference due to coexistence, and 2) the UE transmitter is causing disruptive interference to another radio. The UE then sends a message indicating the coexistence issue to the eNB while reestablishing connection in the new channel or RAT. The eNB becomes aware of the coexistence issue by virtue of having received the message.

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "$3^{rd}$ Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Referring to FIG. 1, a multiple access wireless communication system according to one aspect is illustrated. An evolved Node B 100 (eNB) includes a computer 115 that has processing resources and memory resources to manage the LTE communications by allocating resources and parameters, granting/denying requests from user equipment, and/or the like. The eNB 100 also has multiple antenna groups, one group including antenna 104 and antenna 106, another group including antenna 108 and antenna 110, and an additional group including antenna 112 and antenna 114. In FIG. 1, only two antennas are shown for each antenna group, however, more or fewer antennas can be utilized for each antenna group. A User Equipment (UE) 116 (also referred to as an Access Terminal (AT)) is in communication with antennas 112 and 114, while antennas 112 and 114 transmit information to the UE 116 over a downlink (DL) 120 and receive information from the UE 116 over an uplink (UL) 118. The UE 122 is in communication with antennas 106 and 108, while antennas 106 and 108 transmit information to the UE 122 over a downlink (DL) 126 and receive information from the UE 122 over an uplink 124. In an FDD system, communication links 118, 120, 124 and 126 can use different frequencies for communication. For example, the downlink 120 can use a different frequency than used by the uplink 118.

Each group of antennas and/or the area in which they are designed to communicate is often referred to as a sector of the eNB. In this aspect, respective antenna groups are designed to communicate to UEs in a sector of the areas covered by the eNB 100.

In communication over the downlinks 120 and 126, the transmitting antennas of the eNB 100 utilize beamforming to improve the signal-to-noise ratio of the uplinks for the different UEs 116 and 122. Also, an eNB using beamforming to transmit to UEs scattered randomly through its coverage causes less interference to UEs in neighboring cells than a UE transmitting through a single antenna to all its UEs.

An eNB can be a fixed station used for communicating with the terminals and can also be referred to as an access point, base station, or some other terminology. A UE can also be called an access terminal, a wireless communication device, terminal, or some other terminology.

Figure 2:
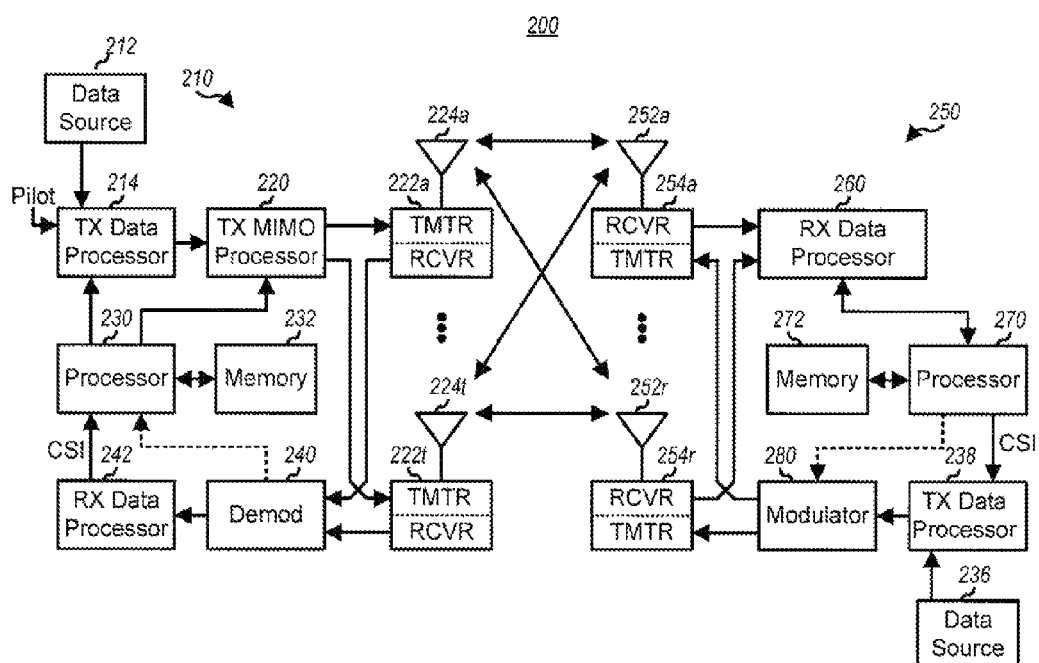
FIG. 2 is a block diagram of a communication system according to one aspect.

FIG. 2 is a block diagram of an aspect of a transmitter system 210 (also known as an eNB) and a receiver system 250 (also known as a UE) in a MIMO system 200. In some instances, both a UE and an eNB each have a transceiver that includes a transmitter system and a receiver system. At the transmitter system 210, traffic data for a number of data streams is provided from a data source 212 to a transmit (TX) data processor 214.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, wherein $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the uplink and downlink transmissions are on the same frequency region so that the reciprocity principle allows the estimation of the downlink channel from the uplink channel. This enables the eNB to extract transmit beamforming gain on the downlink when multiple antennas are available at the eNB.

In an aspect, each data stream is transmitted over a respective transmit antenna. The TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is a known data pattern processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by a processor 230 operating with a memory 232.

The modulation symbols for respective data streams are then provided to a TX MIMO processor 220, which can further process the modulation symbols (e.g., for OFDM). The TX MIMO processor 220 then provides $N_T$ modulation symbol streams to $N_T$ transmitters (TMTR) 222a through 222t. In certain aspects, the TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from the transmitters 222a through 222t are then transmitted from $N_T$ antennas 224a through 224t, respectively.

At a receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_R$ "detected" symbol streams. The RX data processor 260 then demodulates, deinterleaves, and decodes each detected symbol stream to recover the traffic data for the data stream. The processing by the RX data processor 260 is complementary to the processing performed by the TX MIMO processor 220 and the TX data processor 214 at the transmitter system 210.

A processor 270 (operating with a memory 272) periodically determines which pre-coding matrix to use (discussed below). The processor 270 formulates an uplink message having a matrix index portion and a rank value portion.

The uplink message can include various types of information regarding the communication link and/or the received data stream. The uplink message is then processed by a TX data processor 238, which also receives traffic data for a number of data streams from a data source 236, modulated by a modulator 280, conditioned by transmitters 254a through 254r, and transmitted back to the transmitter system 210.

At the transmitter system 210, the modulated signals from the receiver system 250 are received by antennas 224, conditioned by receivers 222, demodulated by a demodulator 240, and processed by an RX data processor 242 to extract the uplink message transmitted by the receiver system 250. The processor 230 then determines which pre-coding matrix to use for determining the beamforming weights, then processes the extracted message.

Figure 3:
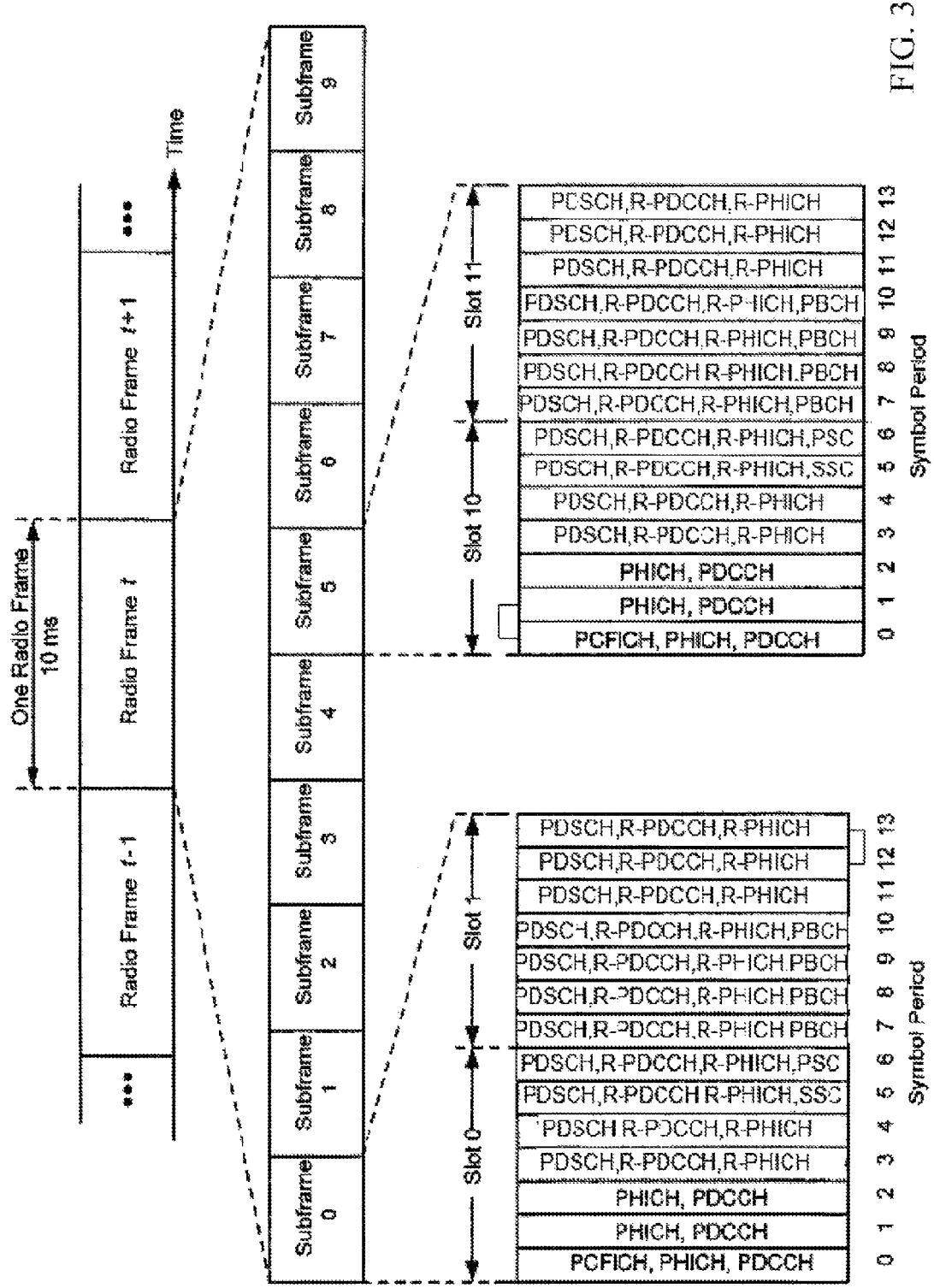
FIG. 3 illustrates an exemplary frame structure in downlink Long Term Evolution (LTE) communications.

FIG. 3 is a block diagram conceptually illustrating an exemplary frame structure in downlink Long Term Evolution (LTE) communications. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a Primary Synchronization Signal (PSS) and a Secondary Synchronization Signal (SSS) for each cell in the eNB. The PSS and SSS may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Cell-specific Reference Signal (CRS) for each cell in the eNB. The CRS may be sent in symbols 0, 1, and 4 of each slot in case of the normal cyclic prefix, and in symbols 0, 1, and 3 of each slot in case of the extended cyclic prefix. The CRS may be used by UEs for coherent demodulation of physical channels, timing and frequency tracking, Radio Link Monitoring (RLM), Reference Signal Received Power (RSRP), and Reference Signal Received Quality (RSRQ) measurements, etc.

The eNB may send a Physical Control Format Indicator Channel (PCFICH) in the first symbol period of each subframe, as seen in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 3. The PHICH may carry information to support Hybrid Automatic Repeat Request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
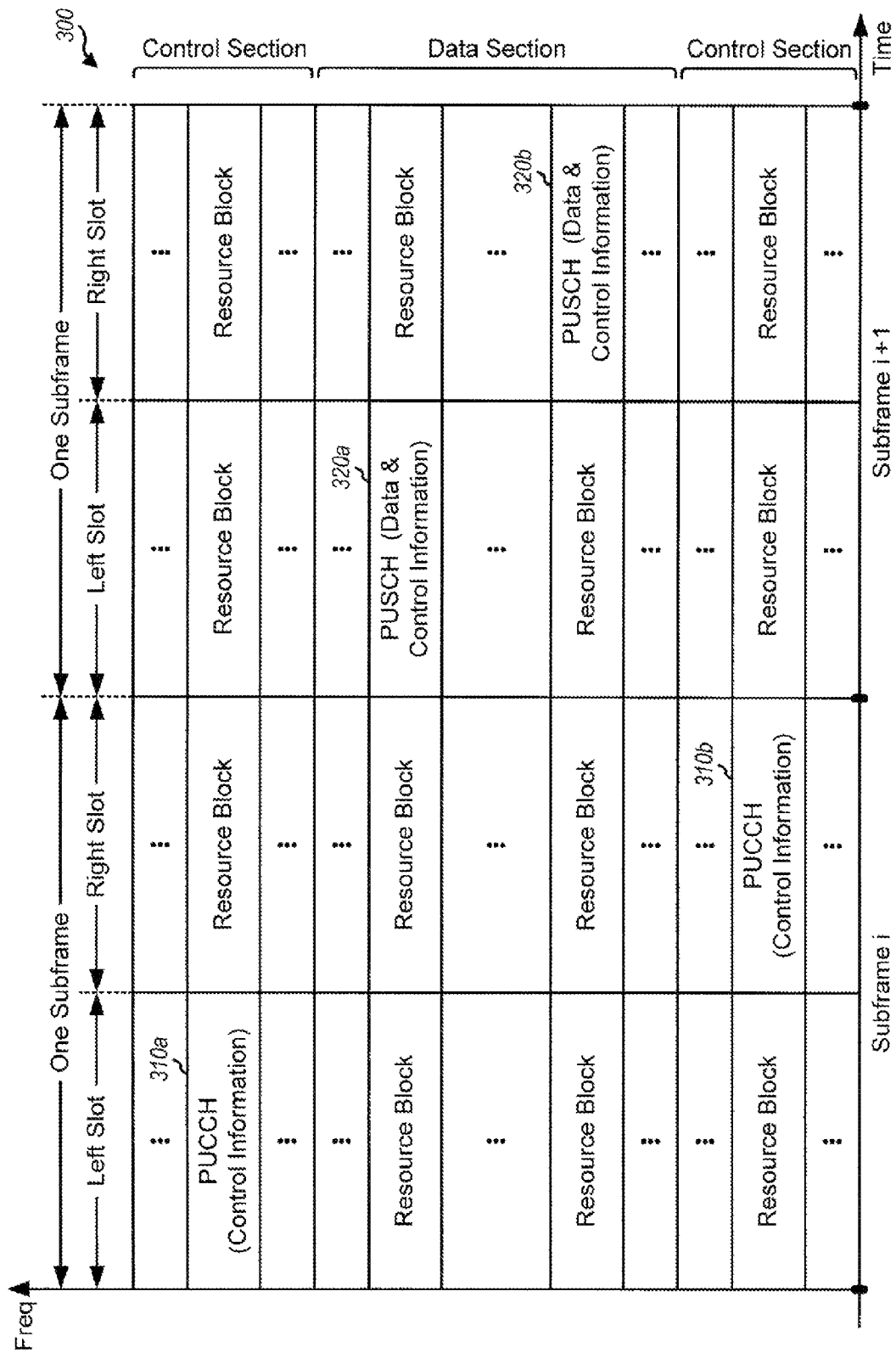
FIG. 4 is a block diagram conceptually illustrating an exemplary frame structure in uplink Long Term Evolution (LTE) communications.

FIG. 4 is a block diagram conceptually illustrating an exemplary frame structure 300 in uplink Long Term Evolution (LTE) communications. The available Resource Blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNodeB. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 4.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

In an aspect, described herein are systems and methods for providing support within a wireless communication environment, such as a 3GPP LTE environment or the like, to facilitate multi-radio coexistence solutions.

Figure 5:
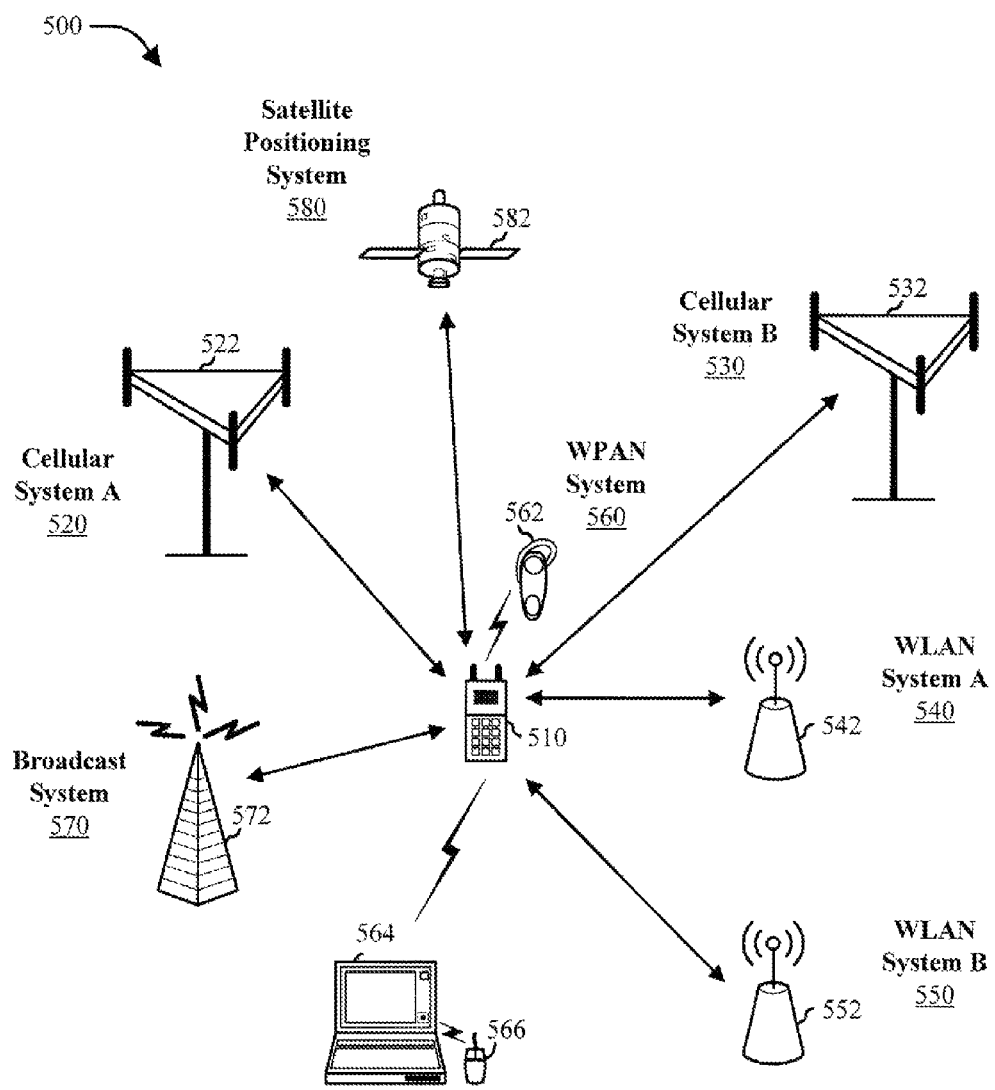
FIG. 5 illustrates an example wireless communication environment.

Referring now to FIG. 5, illustrated is an example wireless communication environment 500 in which various aspects described herein can function. The wireless communication environment 500 can include a wireless device 510, which can be capable of communicating with multiple communication systems. These systems can include, for example, one or more cellular systems 520 and/or 530, one or more WLAN systems 540 and/or 550, one or more wireless personal area network (WPAN) systems 560, one or more broadcast systems 570, one or more satellite positioning systems 580, other systems not shown in FIG. 5, or any combination thereof. It should be appreciated that in the following description the terms "network" and "system" are often used interchangeably.

The cellular systems 520 and 530 can each be a CDMA, TDMA, FDMA, OFDMA, Single Carrier FDMA (SC-FDMA), or other suitable system. A CDMA system can implement a radio technology such as Universal Terrestrial Radio Access (UTRA), cdma2000, etc. UTRA includes Wideband CDMA (WCDMA) and other variants of CDMA. Moreover, cdma2000 covers IS-2000 (CDMA2000 1X), IS-95 and IS-856 (HRPD) standards. A TDMA system can implement a radio technology such as Global System for Mobile Communications (GSM), Digital Advanced Mobile Phone System (D-AMPS), etc. An OFDMA system can implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3$^{rd}$ Generation Partnership Project" (3GPP). cdma2000 and UMB are described in documents from an organization named "3$^{rd}$ Generation Partnership Project 2" (3GPP2). In an aspect, the cellular system 520 can include a number of base stations 522, which can support bi-directional communication for wireless devices within their coverage. Similarly, the cellular system 530 can include a number of base stations 532 that can support bi-directional communication for wireless devices within their coverage.

WLAN systems 540 and 550 can respectively implement radio technologies such as IEEE 802.11 (WiFi), Hiperlan, etc. The WLAN system 540 can include one or more access points 542 that can support bi-directional communication. Similarly, the WLAN system 550 can include one or more access points 552 that can support bi-directional communication. The WPAN system 560 can implement a radio technology such as Bluetooth (BT), IEEE 802.15, etc. Further, the WPAN system 560 can support bi-directional communication for various devices such as wireless device 510, a headset 562, a computer 564, a mouse 566, or the like.

The broadcast system 570 can be a television (TV) broadcast system, a frequency modulation (FM) broadcast system, a digital broadcast system, etc. A digital broadcast system can implement a radio technology such as MediaFLO™, Digital Video Broadcasting for Handhelds (DVB-H), Integrated Services Digital Broadcasting for Terrestrial Television Broadcasting (ISDB-T), or the like. Further, the broadcast system 570 can include one or more broadcast stations 572 that can support one-way communication.

The satellite positioning system 580 can be the United States Global Positioning System (GPS), the European Galileo system, the Russian GLONASS system, the Quasi-Zenith Satellite System (QZSS) over Japan, the Indian Regional Navigational Satellite System (IRNSS) over India, the Beidou system over China, and/or any other suitable system. Further, the satellite positioning system 580 can include a number of satellites 582 that transmit signals for position determination.

In an aspect, the wireless device 510 can be stationary or mobile and can also be referred to as a user equipment (UE), a mobile station, a mobile equipment, a terminal, an access terminal, a subscriber unit, a station, etc. The wireless device 510 can be cellular phone, a personal digital assistance (PDA), a wireless modem, a handheld device, a laptop computer, a cordless phone, a wireless local loop (WLL) station, etc. In addition, a wireless device 510 can engage in two-way communication with the cellular system 520 and/or 530, the WLAN system 540 and/or 550, devices with the WPAN system 560, and/or any other suitable systems(s) and/or devices (s). The wireless device 510 can additionally or alternatively receive signals from the broadcast system 570 and/or satellite positioning system 580. In general, it can be appreciated that the wireless device 510 can communicate with any number of systems at any given moment. Also, the wireless device 510 may experience coexistence issues among various ones of its constituent radio devices that operate at the same time. Accordingly, device 510 includes a coexistence manager (CxM, not shown) that has a functional module to detect and mitigate coexistence issues, as explained further below.

Figure 6:
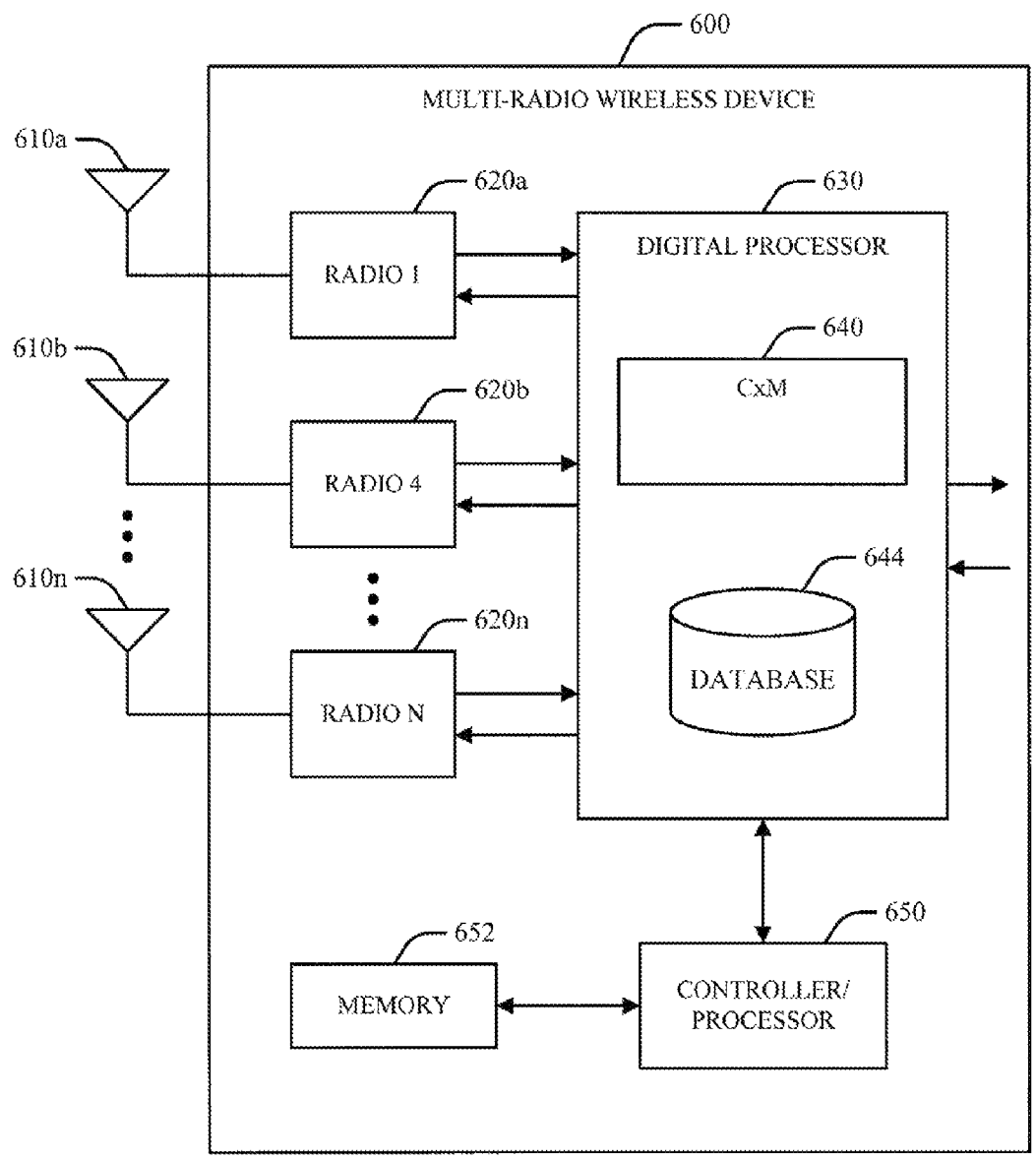
FIG. 6 is a block diagram of an example design for a multi-radio wireless device.

Turning next to FIG. 6, a block diagram is provided that illustrates an example design for a multi-radio wireless device 600 and may be used as an implementation of the radio 510 of FIG. 5. As FIG. 6 illustrates, the wireless device 600 can include N radios 620a through 620n, which can be coupled to N antennas 610a through 610n, respectively, where N can be any integer value. It should be appreciated, however, that respective radios 620 can be coupled to any number of antennas 610 and that multiple radios 620 can also share a given antenna 610.

In general, a radio 620 can be a unit that radiates or emits energy in an electromagnetic spectrum, receives energy in an electromagnetic spectrum, or generates energy that propagates via conductive means. By way of example, a radio 620 can be a unit that transmits a signal to a system or a device or a unit that receives signals from a system or device. Accordingly, it can be appreciated that a radio 620 can be utilized to support wireless communication. In another example, a radio 620 can also be a unit (e.g., a screen on a computer, a circuit board, etc.) that emits noise, which can impact the performance of other radios. Accordingly, it can be further appreciated that a radio 620 can also be a unit that emits noise and interference without supporting wireless communication.

In an aspect, respective radios 620 can support communication with one or more systems. Multiple radios 620 can additionally or alternatively be used for a given system, e.g., to transmit or receive on different frequency bands (e.g., cellular and PCS bands).

In another aspect, a digital processor 630 can be coupled to radios 620a through 620n and can perform various functions, such as processing for data being transmitted or received via the radios 620. The processing for each radio 620 can be dependent on the radio technology supported by that radio and can include encryption, encoding, modulation, etc., for a transmitter; demodulation, decoding, decryption, etc., for a receiver, or the like. In one example, the digital processor 630 can include a CxM 640 that can control operation of the radios 620 in order to improve the performance of the wireless device 600 as generally described herein. The CxM 640 can have access to a database 644, which can store information used to control the operation of the radios 620. As explained further below, the CxM 640 can be adapted for a variety of techniques to decrease interference between the radios. In one example, the CxM 640 requests a measurement gap pattern or DRX cycle that allows an ISM radio to communicate during periods of LTE inactivity.

For simplicity, digital processor 630 is shown in FIG. 6 as a single processor. However, it should be appreciated that the digital processor 630 can include any number of processors, controllers, memories, etc. In one example, a controller/processor 650 can direct the operation of various units within the wireless device 600. Additionally or alternatively, a memory 652 can store program codes and data for the wireless device 600. The digital processor 630, controller/processor 650, and memory 652 can be implemented on one or more integrated circuits (ICs), application specific integrated circuits (ASICs), etc. By way of specific, non-limiting example, the digital processor 630 can be implemented on a Mobile Station Modem (MSM) ASIC.

Figure 7:
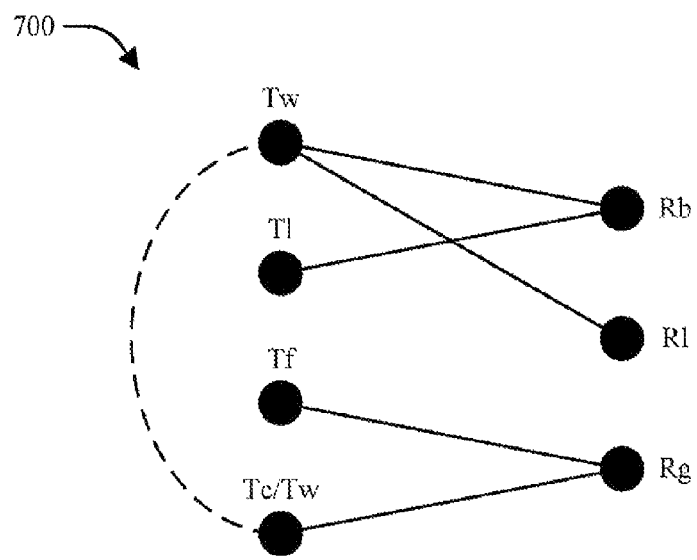
FIG. 7 is graph showing respective potential collisions between seven example radios in a given decision period.

In an aspect, the CxM 640 can manage operation of respective radios 620 utilized by wireless device 600 in order to avoid interference and/or other performance degradation associated with collisions between respective radios 620. CxM 640 may perform one or more processes, such as that illustrated in FIG. 11. By way of further illustration, a graph 700 in FIG. 7 represents respective potential collisions between seven example radios in a given decision period. In the example shown in graph 700, the seven radios include a WLAN transmitter (Tw), an LTE transmitter (Tl), an FM transmitter (Tf), a GSM/WCDMA transmitter (Tc/Tw), an LTE receiver (Rl), a Bluetooth receiver (Rb), and a GPS receiver (Rg). The four transmitters are represented by four nodes on the left side of the graph 700. The four receivers are represented by three nodes on the right side of the graph 700.

A potential collision between a transmitter and a receiver is represented on the graph 700 by a branch connecting the node for the transmitter and the node for the receiver. Accordingly, in the example shown in the graph 700, collisions may exist between (1) the WLAN transmitter (Tw) and the Bluetooth receiver (Rb); (2) the LTE transmitter (Tl) and the Bluetooth receiver (Rb); (3) the WLAN transmitter (Tw) and the LTE receiver (Rl); (4) the FM transmitter (Tf) and the GPS receiver (Rg); (5) a WLAN transmitter (Tw), a GSM/WCDMA transmitter (Tc/Tw), and a GPS receiver (Rg).

Figure 8:
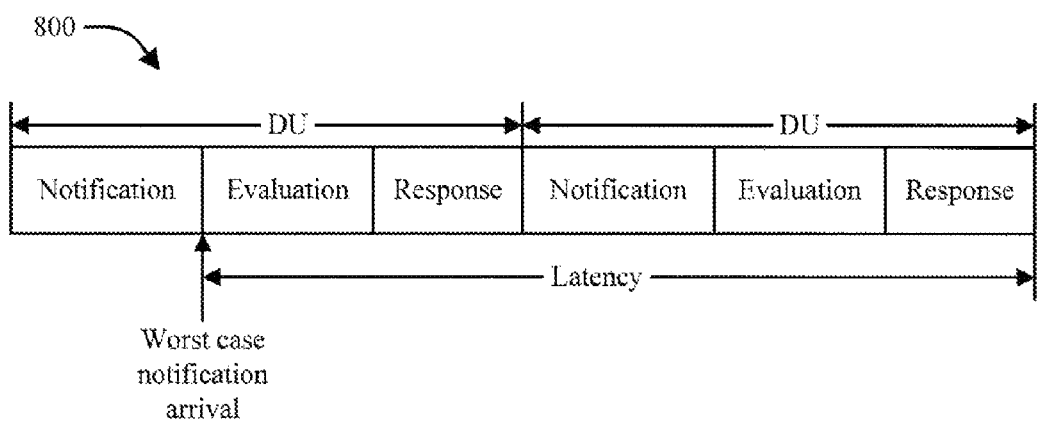
FIG. 8 is a diagram showing operation of an example Coexistence Manager (CxM) over time.

In one aspect, an example CxM 640 can operate in time in a manner such as that shown by diagram 800 in FIG. 8. As diagram 800 illustrates, a timeline for CxM operation can be divided into Decision Units (DUs), which can be any suitable uniform or non-uniform length (e.g., 100 µs) where notifications are processed, and a response phase (e.g., 20 µs) where commands are provided to various radios 620 and/or other operations are performed based on actions taken in the evaluation phase. In one example, the timeline shown in the diagram 800 can have a latency parameter defined by a worst case operation of the timeline, e.g., the timing of a response in the case that a notification is obtained from a given radio immediately following termination of the notification phase in a given DU.

In-device coexistence problems can exist with respect to a UE between resources such as, for example, LTE and ISM bands (e.g., for Bluetooth/WLAN). In current LTE implementations, any interference issues to LTE are reflected in the DL measurements (e.g., Reference Signal Received Quality (RSRQ) metrics, etc.) reported by a UE and/or the DL error rate which the eNB can use to make inter-frequency or inter-RAT handoff decisions to, e.g., move LTE to a channel or RAT with no coexistence issues. However, it can be appreciated that these existing techniques will not work if, for example, the LTE UL is causing interference to Bluetooth/WLAN but the LTE DL does not see any interference from Bluetooth/WLAN. More particularly, even if the UE autonomously moves itself to another channel on the UL, the eNB can in some cases handover the UE back to the problematic channel for load balancing purposes. In any case, it can be appreciated that existing techniques do not facilitate use of the bandwidth of the problematic channel in the most efficient way.

Figure 9:
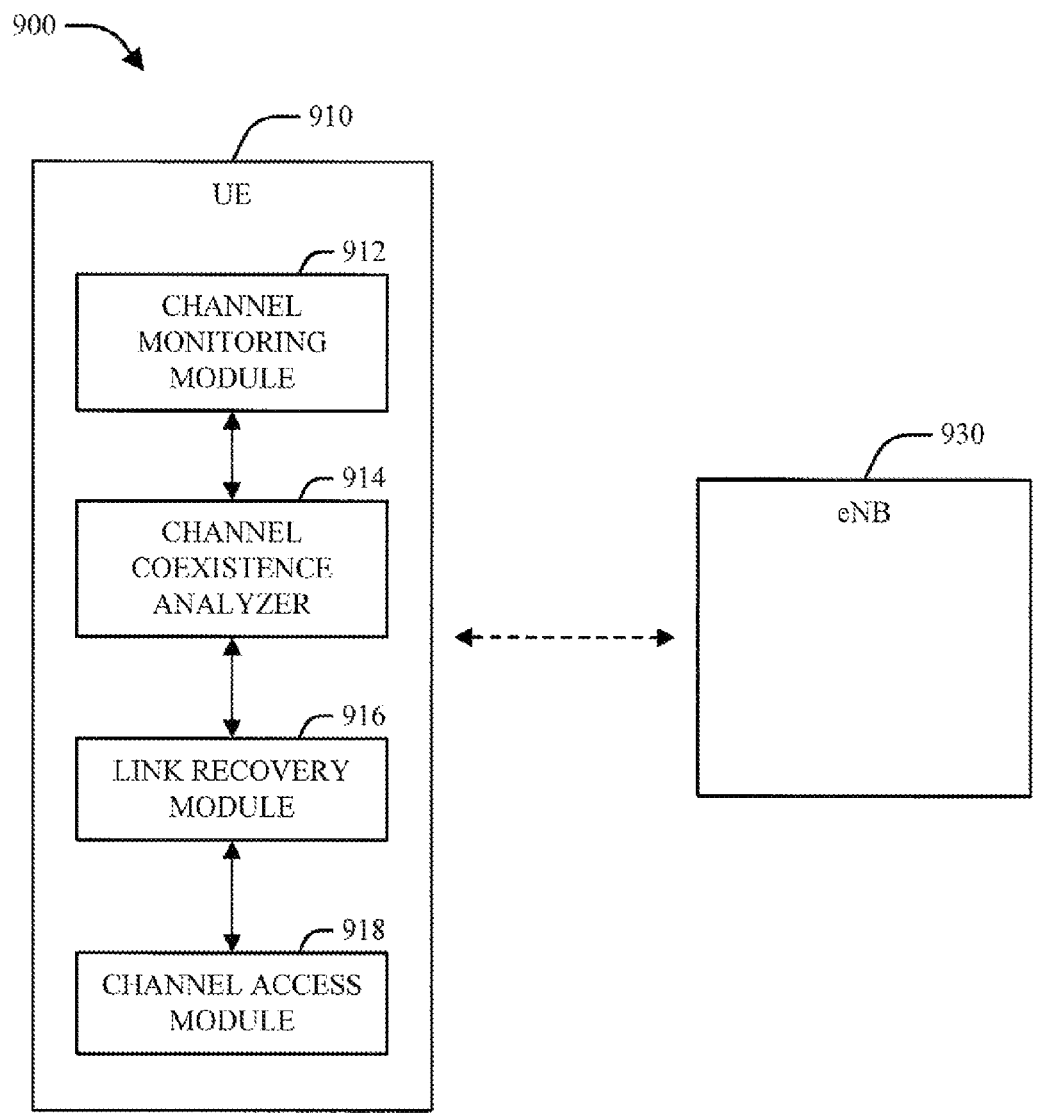
FIG. 9 is a block diagram of a system for providing support within a wireless communication environment for multi-radio coexistence management according to one aspect.

Turning now to FIG. 9, a block diagram of a system 900 for providing support within a wireless communication environment for multi-radio coexistence management is illustrated. In an aspect, the system 900 can include one or more UEs 910 and/or eNBs 930, which can engage in UL, DL, and/or any other suitable communication with each other and/or any other entities in the system 900. In one example, the UE 910 and/or eNB 930 can be operable to communicate using a variety of resources, including frequency channels and sub-bands, some of which can potentially be colliding with other radio resources (e.g., a Bluetooth radio). Thus, the UE 910 can utilize various techniques for managing coexistence between multiple radios of the UE 910, as generally described herein.

To mitigate at least the above shortcomings, the UE 910 can utilize respective features described herein and illustrated by the system 900 to facilitate support for multi-radio coexistence within the UE 910. The various modules 912-918 may, in some examples, be implemented as part of a coexistence manager such as the CxM 640 of FIG. 6.

In a first aspect, the UE 910 can initiate a coexistence-related handover by initiating link recovery procedures, such as by declaring a radio link failure (RLF), and autonomously accessing a new channel if there is a coexistence issue on a present channel. Thus, for example, a channel monitoring module 912, with the aid of a channel coexistence analyzer 914 and/or other components, can monitor one or more communication channels utilized by the UE 910 and monitor such channels for coexistence issues. The monitoring recognizes that unacceptable performance occurs or is expected to occur due to interference. In one example, a device with multiple radios is equipped to detect interference. Additionally or alternatively, the device may be programmed to know that when certain radios use certain channels, coexistence issues are present. Additionally or alternatively, the device may be programmed to know that certain radios operating at the same time will have coexistence issues.

RLF refers to Radio Link Failure, and in one embodiment is detected when the UE detects a significant problem on the downlink (e.g., bad signal for an extended period of time) or uplink (e.g., message failures with multiple repetitions). After RLF, the UE selects a cell for recovery procedures, and this cell may be the same/different as the previous cell. The recovery procedures involve a random access channel (RACH).

If a coexistence issue is identified, a link recovery module 916 and/or other component at the UE 910 can declare initiate link recovery procedures, such as a radio link failure event, thereby enabling a channel access module 918 and/or other suitable mechanisms to access one or more new communication channels or RAT for use by the UE 910. The UE can select the new channel or RAT based on its estimate of channels and RATs where coexistence problems are low. In one example, upon accessing a new channel, The UE 910 can indicate the underlying coexistence issue to the eNB 930 while reestablishing connection in the new channel. By doing so, the eNB 930 can become aware of the coexistence issue.

In one embodiment, the UE provides enhanced measurement reports for the condition of each frequency or RAT being reported. The enhanced measurement reports can include, for example, an interfering technology identifier and/or interfering direction information.

The interfering technology indicator can identify the interfering technology on the device corresponding to the reported channel/RAT, such as Bluetooth, WLAN, GPS, etc. The interfering technology indicator can also specify the parameters associated with the traffic type on the interfering technology, such as voice, data, etc. The eNB may use such information if the eNB has a policy for making a handover decision based on the priority of the other technology being protected. For instance, for LTE-ISM coexistence, the eNB may choose to handover to protect Bluetooth but not WLAN.

The interfering direction information can include one bit to identify whether the uplink of the reported channel/RAT is causing an in-device coexistence problem. Another bit can identify whether the downlink of the reported channel/RAT is experiencing degradation due to in-device coexistence. It may be possible that both bits are set to indicate coexistence issues on both LTE uplink and downlink. The direction information identifies whether LTE is the aggressor, the victim or both with respect to the in-device interference. The interfering direction information can be used along the with interfering technology identifier in the handover decision at the eNB. The interfering direction information and interfering technology identifier may also be used by the eNB to modify scheduling on the downlink and the uplink for the UE either in absence of or in addition to the handover mechanism.

As mentioned above, the UE 910 can declare to the eNB 930 the radio link failure is related to coexistence. For instance, the UE 910 and eNB 930 may have a variety of cause values that they understand, and a cause value can be understood to correspond to a coexistence radio link failure. The message may also include the channel/frequency where coexistence is a problem.

In one example, Radio Resource Control (RRC) messaging can be modified to include coexistence failure information. The RRC protocol handles the Layer 3 control plane signaling and controls behavior of the UE 910 including System Information (SI) broadcasting, connection control such as handover within LTE, network-controlled inter-Radio Access Technology (RAT) mobility and measurement configuration and reporting. For example, the RRCConnectionReestablishmentRequest message may be modified to add a new value "coexistenceFailure" for the enumerated type variable ReestablishmentCause. Also, a new container with a black list of channels/frequencies may be added to the message if desired, where the blacklist indicates resources that are (or may be) experiencing coexistence issues. Any other message may also be used to indicate such frequencies.

In another example, the coexistence issue is indicated implicitly, rather than explicitly, by the UE 910 to the eNB 930. For instance, the UE's accessing a new channel can be an indication to the eNB 930 that the UE 910 has experienced a coexistence issue on the previous channel.

The examples above focus on the transfer of coexistence information from the UE 910 to the eNB 930. However, in some aspects, the eNB 930 has access to coexistence information independently of any radio link failure messaging. For instance, the eNB 930 may discern channels where coexistence could be a problem based on, e.g., a UE report, configuration and radio knowledge, and/or the QoS/traffic-types of the user. When the eNB 930 knows which channels have a potential coexistence issue, the eNB 930 may proactively avoid allocating such channel for LTE communications as long as the potential issue persists.

In an aspect, the eNB 930 can use coexistence information to avoid handing the UE 910 back to the problematic channel (s), as would otherwise be done in conventional LTE. In one present aspect, when the eNB 930 becomes aware of the coexistence radio link failure, the eNB 930 sets a timer so that it does not send the UE 910 back to the other channel at least before the timer expires.

Figure 10:
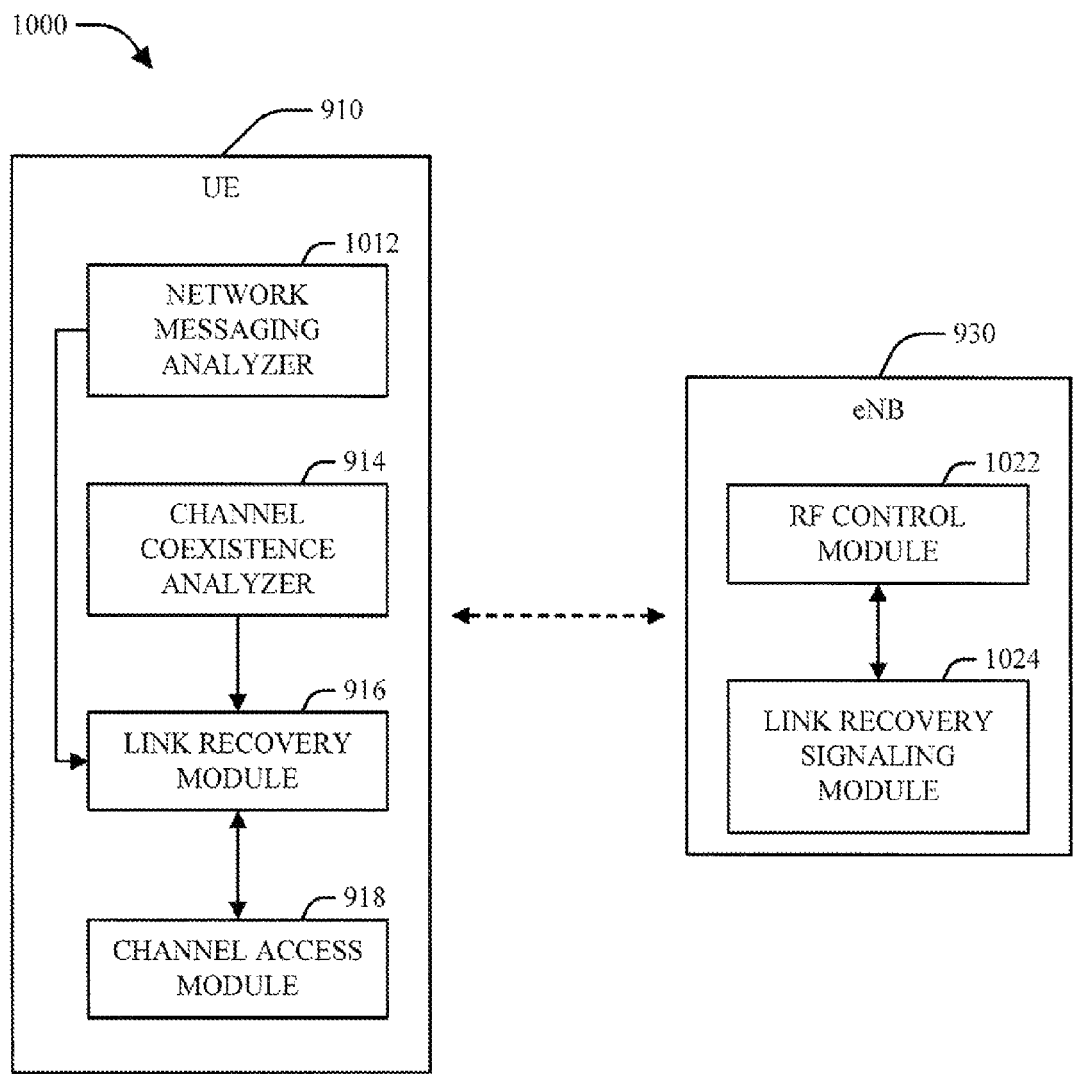
FIG. 10 is a block diagram of a system for providing support within a wireless communication environment for multi-radio coexistence management according to one aspect.

In another aspect, a network (e.g., a network associated with the eNB 930, which can utilize any suitable RAT, such as LTE, WLAN, UMTS, etc.) can be configured with the ability to at least partly control the coexistence-based radio link failure declaration procedure. Thus, as illustrated by the system 1000 in FIG. 10, a network (e.g., via the eNB 930) can permit or disallow the UE 910 to perform a coexistence-based radio link failure declaration procedure depending on various factors. Such factors can include, for example, UE capabilities, deployment information, loading information, and/or the like. In an aspect, such a determination can be performed via a RLF control module 1022 and/or other suitable mechanisms associated with the eNB 930.

In a further aspect, the eNB 930 can utilize a link recovery signaling module 1024 or the like to construct and communicate a dynamic message to the UE 910, which can carry permission information that can be utilized by the UE 910 in determining whether to perform a coexistence-based link recovery procedure, such as a RLF declaration. For example, the UE 910 includes a network messaging analyzer 1012 that analyzes permission messaging from the eNB 930 to direct operation of the link recovery module 916 as generally described above. The LTE network can use a dynamic message from the eNB 930 to the UE 910 to carry the permission information, where the message can include, e.g., an RRC message or other message.

The techniques described above with respect to FIGS. 9 and 10 differ from conventional LTE processes. For instance, the UE 910 is given some ability to direct its own operation through use of the radio link failure procedure in which it reestablishes connection with another channel or RAT autonomously. Additionally, when interference affects an uplink signal but not a downlink signal (and, thus, the eNB 930 is unaware of the coexistence issue), the UE 910 initiates the coexistence mitigation procedure, thereby assuring action is taken in response to the coexistence issue. By contrast, in conventional LTE only the eNB 930 initiates handoffs, and the handoffs are based on UE downlink channel measurements only. Also, the eNB 930 is given more information regarding interference than in some conventional LTE systems, e.g., when the UE 910 indicates that the reason for the radio link failure is a coexistence issue and/or when the UE 910 provides a blacklist in a radio link failure message of channels/frequencies that are especially prone to interference. The eNB 930 is less likely to force the UE 910 back onto the resource with coexistence issues because the eNB 930 is aware of the coexistence issues.

Figure 11:
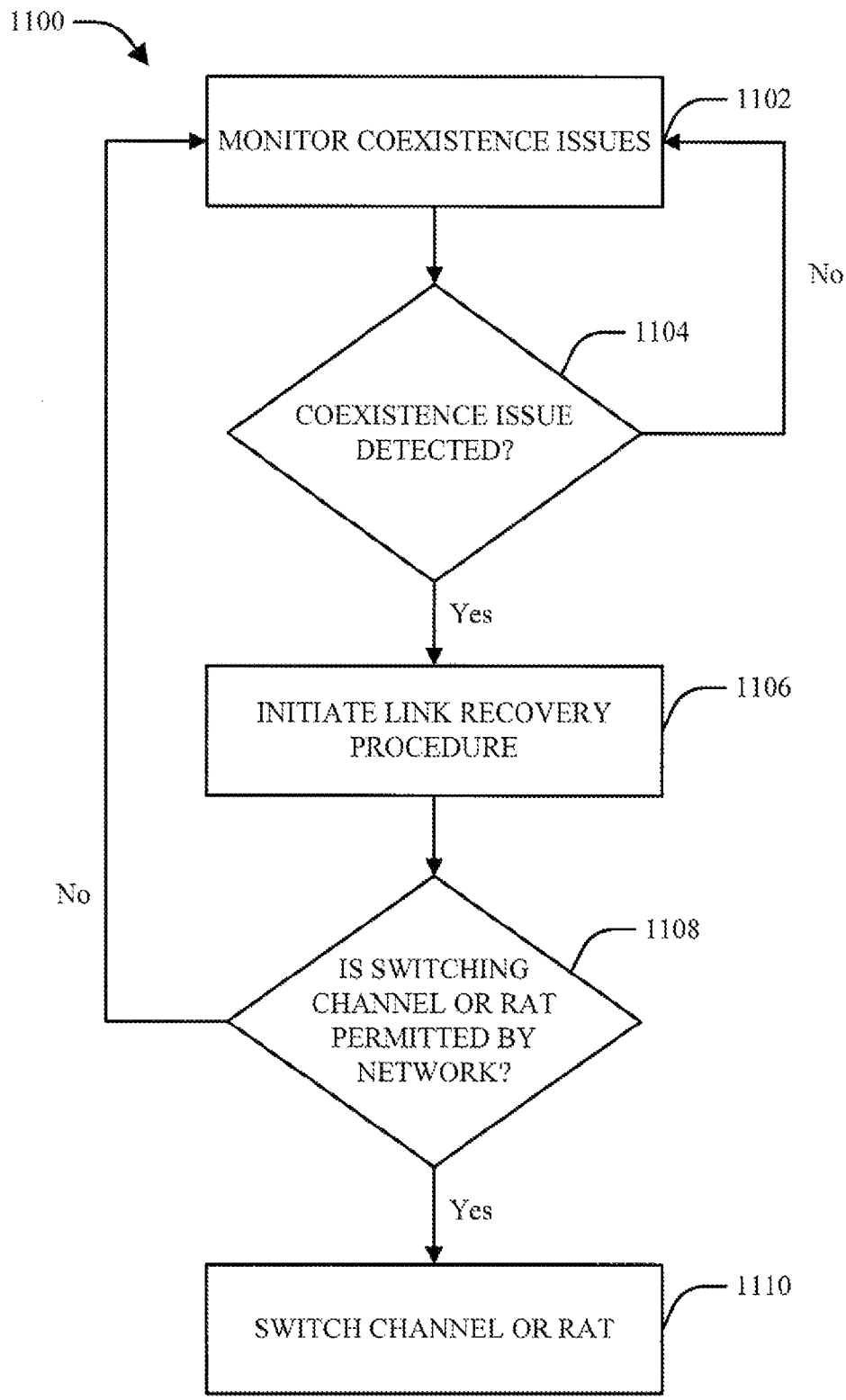
FIG. 11 illustrates a methodology that facilitates implementation of multi-radio coexistence functionality within a wireless communication system.

FIG. 11 illustrates a methodology 1100 that facilitates implementation of multi-radio coexistence functionality within a wireless communication system. The methodology may be implemented, e.g., by a UE configured to declare a radio link failure based at least in part on detected coexistence issues. At block 1102, coexistence issues are monitored. In one example, a device with multiple radios looks for interference among the radios. Additionally or alternatively, a device may be programmed to identify a coexistence issue when certain radios use certain channels. Additionally or alternatively, a device may be programmed to know that certain radios operating at the same time will have coexistence issues. At block 1104, it is discerned whether a coexistence issue is detected. If no coexistence issue is detected, the device continues to monitor the communication resources at block 1102. If a coexistence issue is detected, the device may optionally initiate link recovery procedures at block 1106, for example by declaring a radio link failure.

At block 1108, it is discerned whether switching a channel or RAT is permitted by the network. In some aspects, the network may communicate with the device through an eNB, sending one or more messages to permit or disallow the device to switch a channel or a RAT. Some examples include sending a dynamic message from the eNB to the device to carry the permission information. Whether the network allows the channel/RAT switching can be based at least in part on UE capabilities, deployment information, eNB loading information, and/or the like. For instance, if a particular frequency channel is experiencing a high traffic load, the eNB may prohibit new UEs, including the ones affected by coexistence in other channels, to access it. The permission information can be a blanket permit/deny for all coexistence-based switching or can be a permit/deny for a particular, proposed channel or RAT access.

The device switches a channel or RAT in block 1110 if permitted. If the channel/RAT switch is not permitted, then the device may continue to monitor for other coexistence issues while accepting the detected coexistence issue, at block 1102. In another aspect, the device can propose a different channel/RAT to access.

Figure 12:
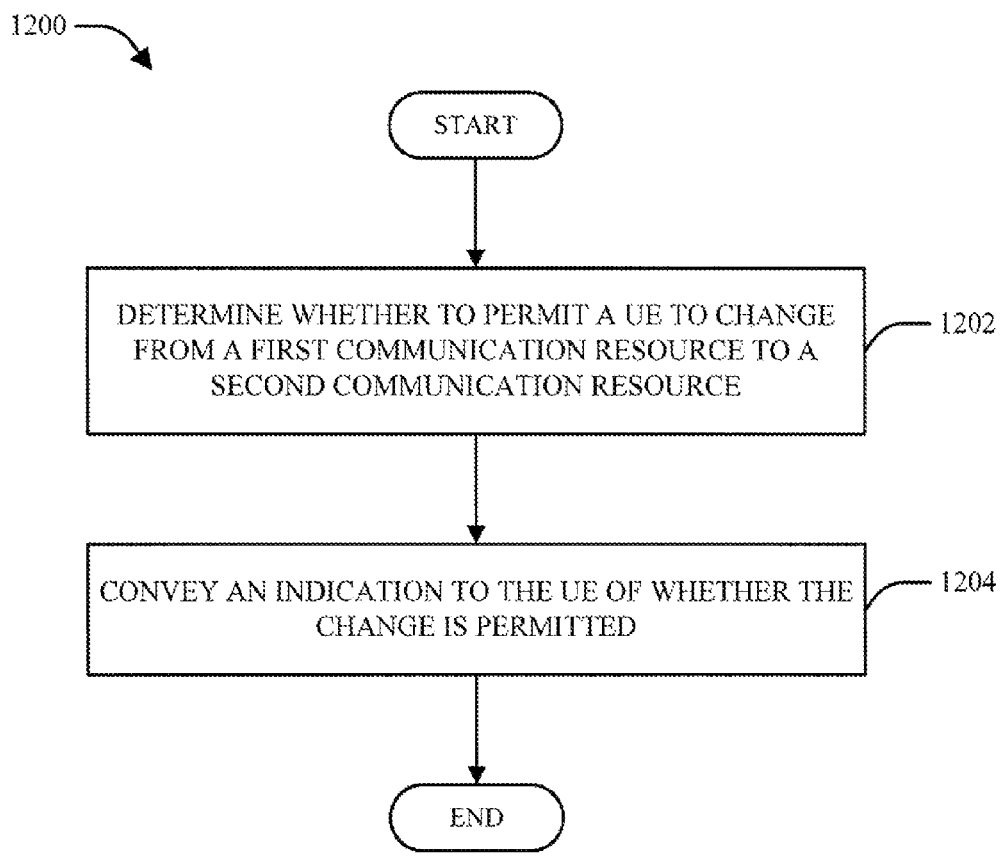
FIG. 12 illustrates a methodology that facilitates implementation of multi-radio coexistence functionality within a wireless communication system.

FIG. 12 illustrates a methodology 1200 that facilitates implementation of multi-radio coexistence functionality within a wireless communication system. The methodology may be performed, e.g., by an eNB or other network equipment, where the eNB conveys messages between the UE and the network. In this example, the network can determine whether to permit the coexistence radio link failure technique described above with respect to FIG. 11. At block 1202, it is determined whether to permit at least one associated User Equipment (UE) to change from a first communication resource to a second communication resource to mitigate a coexistence issue at the UE. As explained above, whether the network allows the channel/RAT switching can be based at least in part on UE capabilities, deployment information, eNB loading information, and/or the like At block 1204, an indication is conveyed to the UE of whether changing from the first communication resource to a second communication resource is permitted. The indication may take the form of a static message (that is issued and not expected to be retracted or modified) or a dynamic message (that may be retracted or modified as conditions change). The indication can be a blanket permit/deny for all coexistence-based switching or can be a permit/deny for a particular, proposed channel or RAT access.

The examples above describe aspects implemented in an LTE system. However, the scope of the disclosure is not so limited. Various aspects may be adapted for use with other communication systems, such as those that employ any of a variety of communication protocols including, but not limited to, CDMA systems, TDMA systems, FDMA systems, and OFDMA systems.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for wireless communication, the method comprising:
    monitoring at least one communication resource on a mobile device for in-device coexistence interference, to determine if an uplink of a first Radio Access Technology (RAT) transmitting from the mobile device is interfering with reception by the at least one communication resource on the mobile device; and
    autonomously accessing, by the mobile device, one of a new channel of the first RAT and a new second RAT in response to detection of the in-device coexistence interference.

2. The method of claim 1, further comprising initiating a link recovery procedure in response to detection of the coexistence interference.

3. The method of claim 2, further comprising:
    selecting the new channel according to an estimate of coexistence interference for the new channel; and
    accessing the new channel upon initiating the link recovery procedure.

4. The method of claim 2, wherein initiating the link recovery procedure comprises declaring a radio link failure.

5. The method of claim 1, further comprising:
    sending a message to a serving base station, the message indicating the detected coexistence interference.

6. The method of claim 5, in which the message indicates the communication resource for which the detected coexistence interference is present.

7. The method of claim 5, the message to the serving base station further comprising interfering direction information, identifying one or both of whether an uplink to the serving base station is causing the detected coexistence interference and whether a downlink from the serving base station is experiencing degradation due to the detected coexistence interference.

8. The method of claim 5, the message to the serving base station further comprising an interfering technology identifier identifying a technology causing the detected coexistence interference.

9. A wireless mobile communication apparatus comprising:
    means for monitoring at least one communication resource on the apparatus for in-device coexistence interference, to determine if an uplink of a first Radio Access Technology (RAT) transmitting from the mobile device is interfering with reception by the at least one communication resource on the apparatus; and
    means for autonomously accessing, by the apparatus, one of a new channel of the first RAT and a new second RAT in response to detection of the in-device coexistence interference.

10. The apparatus of claim 9, further comprising means for initiating a link recovery procedure in response to detection of the coexistence issue inference.

11. A system for wireless communication, the system comprising:
    at least one processor; and
    a memory coupled to the at least one processor, the at least one processor configured:
        to monitor at least one communication resource on a mobile device for in-device coexistence interference, to determine if an uplink of a first Radio Access Technology (RAT) transmitting from the mobile device is interfering with reception by the at least one communication resource on the mobile device; and
        to autonomously access, by the mobile device, one of a new channel of the first RAT and a new second RAT in response to detection of the in-device coexistence issue interference.

12. The system of claim 11, in which the processor is further configured to initiate a link recovery procedure in response to detection of the coexistence interference.

13. The system of claim 12, in which the processor is configured:
    to select the new channel according to an estimate of coexistence interference for the new channel; and
    to access the new channel upon initiating the link recovery procedure.

14. The system of claim 11 in which the processor is configured to send a message to a serving base station, the message indicating the detected coexistence interference.

15. The system of claim 14, in which the message indicates the communication resource for which the detected coexistence interference is present.

16. The system of claim 14, the message to the serving base station to further indicate interfering direction information to identify one or both of whether an uplink to the serving base station is causing the detected coexistence interference and whether a downlink from the serving base station is experiencing degradation due to the detected coexistence interference.

17. The system of claim 14, the message to the serving base station to further indicate an interfering technology identifier to identify a technology causing the detected coexistence interference.

18. A computer program product for wireless communications in a wireless network, comprising:
    a non-transitory computer-readable medium having program code recorded thereon, the program code comprising:
        program code to monitor at least one communication resource on a mobile device for in-device coexistence interference, to determine if an uplink of a first Radio Access Technology (RAT) transmitting from the mobile device is interfering with reception by the at least one communication resource on the mobile device; and program code to autonomously access, by the mobile device, one of a new channel of the first RAT and a new second RAT in response to detection of the in-device coexistence interference.

19. The non-transitory computer readable medium of claim 18, further comprising program code to initiate a link recovery procedure in the response to the detection of the coexistence interference.

20. The non-transitory computer readable medium of claim 18, further comprising program code to send a message comprising an interfering technology identifier, and interfering direction information related to identifying a technology causing the detected coexistence issue interference.

21. The non-transitory computer readable medium of claim 18, further comprising program code to send a message comprising interfering direction information identifying one or both of whether an uplink to the wireless network is causing the detected coexistence interference and whether a downlink from the wireless network is experiencing degradation due to the detected coexistence interference.

* * * * *